(12) United States Patent
Takeuchi

(10) Patent No.: US 12,104,825 B2
(45) Date of Patent: Oct. 1, 2024

(54) HEAT EXCHANGER AND WATER HEATER

(71) Applicant: Paloma Rheem Holdings, Nagoya (JP)

(72) Inventor: Makoto Takeuchi, Nagoya (JP)

(73) Assignee: Paloma Rheem Holdings, Nagoya (JP)

( * ) Notice: Subject to any disclaimer, the term of this patent is extended or adjusted under 35 U.S.C. 154(b) by 0 days.

(21) Appl. No.: 17/965,118

(22) Filed: Oct. 13, 2022

(65) Prior Publication Data

US 2023/0132467 A1 May 4, 2023

(30) Foreign Application Priority Data

Nov. 4, 2021 (JP) .................. 2021-180258

(51) Int. Cl.
| | |
|---|---|
| *F28F 1/32* | (2006.01) |
| *F24H 1/12* | (2022.01) |
| *F28D 21/00* | (2006.01) |
| *F28F 21/08* | (2006.01) |

(52) U.S. Cl.
CPC ......... *F24H 1/124* (2013.01); *F28D 21/0007* (2013.01); *F28F 1/325* (2013.01); *F28F 21/083* (2013.01)

(58) Field of Classification Search
CPC . F24H 1/124; F24H 1/145; F24H 1/40; F24H 9/0015; F24H 9/1836; F24H 8/00; F24H 9/0026; F24H 9/146; F28D 21/0007; F28D 2021/0024; F28D 1/0417; F28D 1/05375; F28D 1/0535; F28D 1/05358; F28F 1/325; F28F 1/32; F28F 21/083; F28F 3/02; F28F 9/02; F28F 9/0131
See application file for complete search history.

(56) References Cited

U.S. PATENT DOCUMENTS

| | | | | |
|---|---|---|---|---|
| 10,254,053 B2* | 4/2019 | Okamoto | .................. | F28F 1/32 |
| 10,295,281 B2* | 5/2019 | Kasamatsu | .............. | F28F 9/26 |
| 10,408,549 B2* | 9/2019 | Oohigashi | ........... | F28D 1/05375 |
| 10,794,640 B2* | 10/2020 | Kondo | .................. | F28D 1/0472 |
| 11,293,702 B2* | 4/2022 | Wada | ........................ | F24H 8/00 |

FOREIGN PATENT DOCUMENTS

| | | | |
|---|---|---|---|
| JP | 2020143841 A | 9/2020 | |
| JP | 2021085580 A * | 6/2021 | ............. F24H 1/107 |

* cited by examiner

*Primary Examiner* — Gregory A Wilson
(74) *Attorney, Agent, or Firm* — Maier & Maier, PLLC

(57) ABSTRACT

A heat exchanger includes a case, fins, and heat transfer tubes. Combustion exhaust gas passes downward in the case. The fins are disposed at a lower portion of the case and arranged in the first direction. Each of the fins includes a first end and a second end that is an opposite end from the first end in a second direction intersecting the first direction. Each of the fins includes through holes in which the heat transfer tubes are inserted. Each of the fins includes heat receiving portions arranged in the second direction and connecting portion connecting the heat receiving portions. The heat receiving portions include a first heat receiving portion disposed at the first end. The first heat receiving portion includes a first recessed portion recessed from an outer edge of an upper part of the first heat receiving portion.

5 Claims, 8 Drawing Sheets

HEAT EXCHANGER AND WATER HEATER

CROSS REFERENCE TO RELATED APPLICATION

This application claims priority from Japanese Patent Application No. 2021-180258 filed on Nov. 4, 2021. The entire contents of the priority application are incorporated herein by reference.

TECHNICAL FIELD

The technology described herein relates to a heat exchanger and a water heater.

BACKGROUND

Conventionally, a primary heat exchanger is known as a heat exchanger used in a water heater. Such a primary heat exchanger can be made of stainless steel and includes an inner casing, fins disposed in the inner casing, and heat transfer tubes. The inner casing is formed in a square cylindrical shape through which combustion exhaust gas from a burner passes downward. The fins are disposed in a lower position of the inner casing and arranged at intervals along a thickness direction of the fins, which corresponds to a right-left direction of the primary heat exchanger. Each of the fins includes two edge portions with respect to a front-rear direction of the primary heat exchanger and the two end portions are fixed to inner wall surfaces of the inner casing. The heat transfer tubes extend through the fins, which are disposed in the inner casing, in the right-left direction. An example of such a system is disclosed in Japanese Unexamined Patent Application Publication No. 2020-143841.

In the primary heat exchanger described above, the combustion exhaust gas from the burner flows downstream by a pressure generated by a fan and passes through between the fins. The heat of the combustion exhaust gas is transferred to the heat transfer tubes via the fins and the heat is further transferred from the heat transfer tubes to water passing through the heat transfer tubes. The temperature of the combustion exhaust gas flowing through the fins on the upstream side is higher than the temperature of the combustion exhaust gas flowing through the fins on the downstream side. Therefore, an upstream side (upper side) portion of the fin has higher temperature than a downstream side (lower side) portion of the fin. Consequently, upper parts of the heat transfer tubes penetrating the fins thermally expand larger than lower parts of the heat transfer tubes penetrating the fins. The heat transfer tubes tend to deform with upward warping.

The heat transfer tubes disposed in a middle of the inner casing are apart from the edge potions of the fins that are fixed to the inner wall surfaces. Therefore, the heat transfer tubes disposed in the middle of the inner casing are likely to deform freely. Consequently, the heat transfer tubes disposed in the middle of the inner casing are likely to be allowed to deform with the upward warping, as described above. On the other hand, the heat transfer tubes disposed in front and rear end portions of the inner casing are near the edge portions of the fins that are fixed to the inner wall surfaces. This restricts deformations of the heat transfer tubes disposed in the front and rear end portions of the inner casing. Therefore, the heat transfer tubes disposed in the front and rear end portions of the inner casing are less likely to be allowed to deform with the upward warping. For this reason, thermal expansion of the heat transfer tubes may cause stress concentration on the heat transfer tubes disposed in the front and rear end portions of the inner casing and this may damage the heat transfer tubes. Such a problem is particularly noticeable in the heat exchanger made of stainless steel that has lower heat conductivity and toughness compared to copper etc.

SUMMARY

The technology described herein was made in view of the above circumstances. An object is to provide a heat exchanger in which heat transfer tubes are less likely to be damaged and to provide a water heater including the heat exchanger.

A heat exchanger according to a first aspect in the present disclosure includes a case, fins, and heat transfer tubes. The case is rectangular cylindrical and made of stainless steel, in which a combustion exhaust gas passes downward. The case includes a first wall, a second wall, a third wall, and a fourth wall. The first wall and the second wall face each other in a first direction. The third wall and the fourth wall face each other in a second direction. The third wall connects one side edges of the first wall and the second wall. The fourth wall connects other side edges of the first wall and the second wall. The fins are made of stainless steel and disposed in a lower portion of the case and arranged in the first direction. Each of the fins has an elongated shape extending in the second direction and includes a first end and a second end that is an opposite end from the first end. Each of the fins includes through holes penetrating each of the fins in the first direction. The heat transfer tubes are made of stainless steel and arranged in the second direction and inserted in the through holes. In this heat exchanger, each of the fins includes heat receiving portions, a first recessed portion, a second recessed portion, connecting portions, a first edge portion, and a second edge portion. The heat receiving portions have a frame shape and extend around the through holes. The heat receiving portions are arranged in the second direction and include a first heat receiving portion disposed at the first end of each of the fins and a second heat receiving portion disposed at the second end of each of the fins. The first recessed portion is included in the first heat receiving portion and recessed from an outer edge of an upper part of the first heat receiving portion. The second recessed portion is included in the second heat receiving portion and recessed from an outer edge of an upper part of the second heat receiving portion. The connecting portions connect the heat receiving portions adjacent to each other in the second direction. The first edge portion protrudes in the first direction from the first end of each of the fins and is fixed to the third wall. The second edge portion protrudes in the first direction from the second end of each of the fins and is fixed to the fourth wall.

In a second aspect of the disclosure based on the first aspect, the first recessed portion is included in a portion of the first heat receiving portion that is an opposite side from the first edge portion in the second direction. The second recessed portion is included in a portion of the second heat receiving portion that is an opposite side from the second edge portion in the second direction.

In a third aspect of the disclosure based on the first or the second aspect, the first recessed portion is near one of the connecting portions connecting the first heat receiving portion and one of the heat receiving portions.

In a fourth aspect of the disclosure based on any one of the first to the third aspects, the first recessed portion includes recessed portions and the first heat receiving portion further includes a protrusion portion disposed between two of the recessed portions adjacent to each other.

A fifth aspect of the disclosure based on the fourth aspect, the through holes include a first through hole around which the first heat receiving portion extends. The protrusion portion has a length extending along a hole edge of the first through hole. Each of the recessed portions has a recessed bottom having a length extending along the hole edge of the first through hole. The length of the protrusion portion is smaller than the length of the recessed bottom of each of the recessed portions.

A sixth aspect of the disclosure is directed to a water heater that includes a burner and the heat exchanger according to any one of the first to the fifth aspects.

According to the technology described herein, a heat exchanger in which damage of heat transfer tubes are suppressed and a water heater with the heat exchanger can be provided.

DETAILED DESCRIPTION

<Embodiment>

One embodiment will be described below with reference to FIGS. 1 to 8. Regarding components having the same configuration, some of the components may be indicated by reference signs and others may not be indicated by the reference signs.

[Whole Structure of Water Heater]

Figure 1:
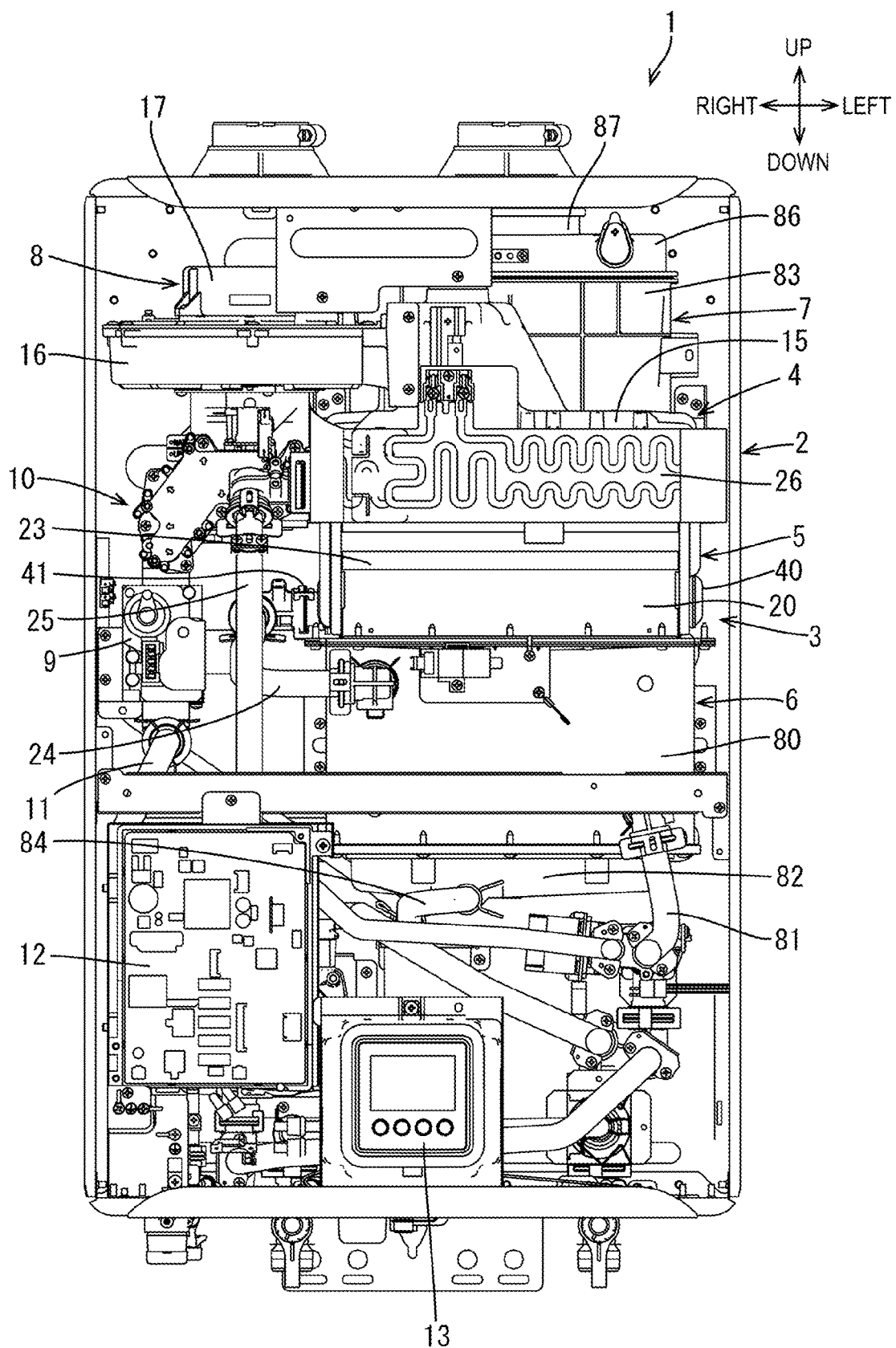
FIG. 1 is a front view of a water heater according to one embodiment with a front cover being not illustrated.
Figure 2:
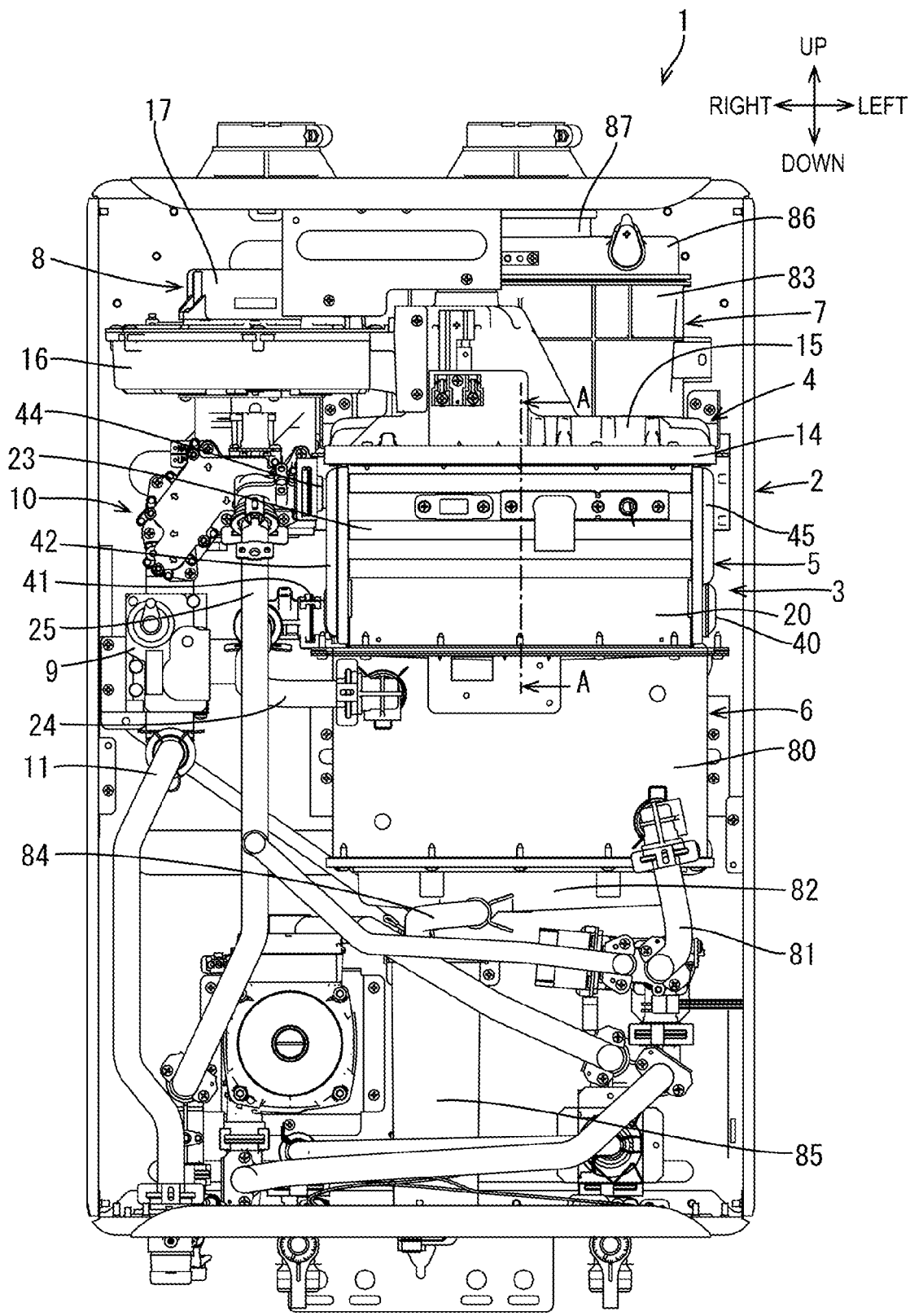
FIG. 2 is a front view of the water heater with a resin sheet, a controller, and a display operation panel being not illustrated.

FIG. 1 is a front view of a water heater 1 and shows the water heater 1 with a front cover being removed. FIG. 2 shows the water heater 1 and does not illustrate a resin sheet 26, a controller 12, and a display operation panel 13, which are shown in FIG. 1.

The water heater 1 includes an outer casing 2 and an inner body 3. The outer casing 2 has a rectangular cylindrical shape and has an opening at a front face. The inner body 3 is housed in the outer casing 2. The inner body 3 includes a burner 4, a primary heat exchanger 5 (one example of a heat exchanger), and a secondary heat exchanger 6 in this order from an upper side. The water heater 1 is a downstream combustion type water heater where combustion exhaust gas from the burner 4 flows from above to below.

An exhaust portion 7, a fan unit 8, and a gas supply unit 10 are arranged in the outer casing 2. The exhaust portion 7 extends from a lower part of the inner body 3 toward a rear side and then toward an upper side. The fan unit 8 is connected to the burner 4 in a right portion of the inner body 3. The gas supply unit 10 is connected to the fan unit 8 under the fan unit 8. The gas supply unit 10 supplies fuel gas from a gas introduce pipe 11 to the fan unit 8 via a gas governor 9. The controller 12 including an electrical board is disposed in a lower right portion of the inner body 3. The display operation panel 13 is disposed in a lower middle portion of the inner body 3. The display operation panel 13 is not covered with the front cover.

[Burner]

The burner 4 is a totally primary air type burner in which a mixture of combustion gas and all air required for burning burns. The burner 4 includes an upper casing 14 that has a laterally-long rectangular plan-view shape. The upper casing 14 has a predetermined depth in the upper-bottom direction and openings in an upper surface and a lower surface of the upper casing 14. The opening in the upper surface of the upper casing 14 is closed by a chamber 15 that is upwardly protruded and connected to the fan unit 8. A frame hole plate (not shown) which has flame holes is disposed in the opening in the lower surface of the upper casing 14. The mixture burns at the surface of a frame hole plate (the lower surface of upper casing 14).

The fan unit 8 includes a fan case 16 having a circular plan-view shape and a fan disposed in the fan case 16. A fan motor 17 that rotationally drives the fan is disposed on an upper side and at a middle with respect to the fan case 16.

[Primary Heat Exchanger]

Figure 3:
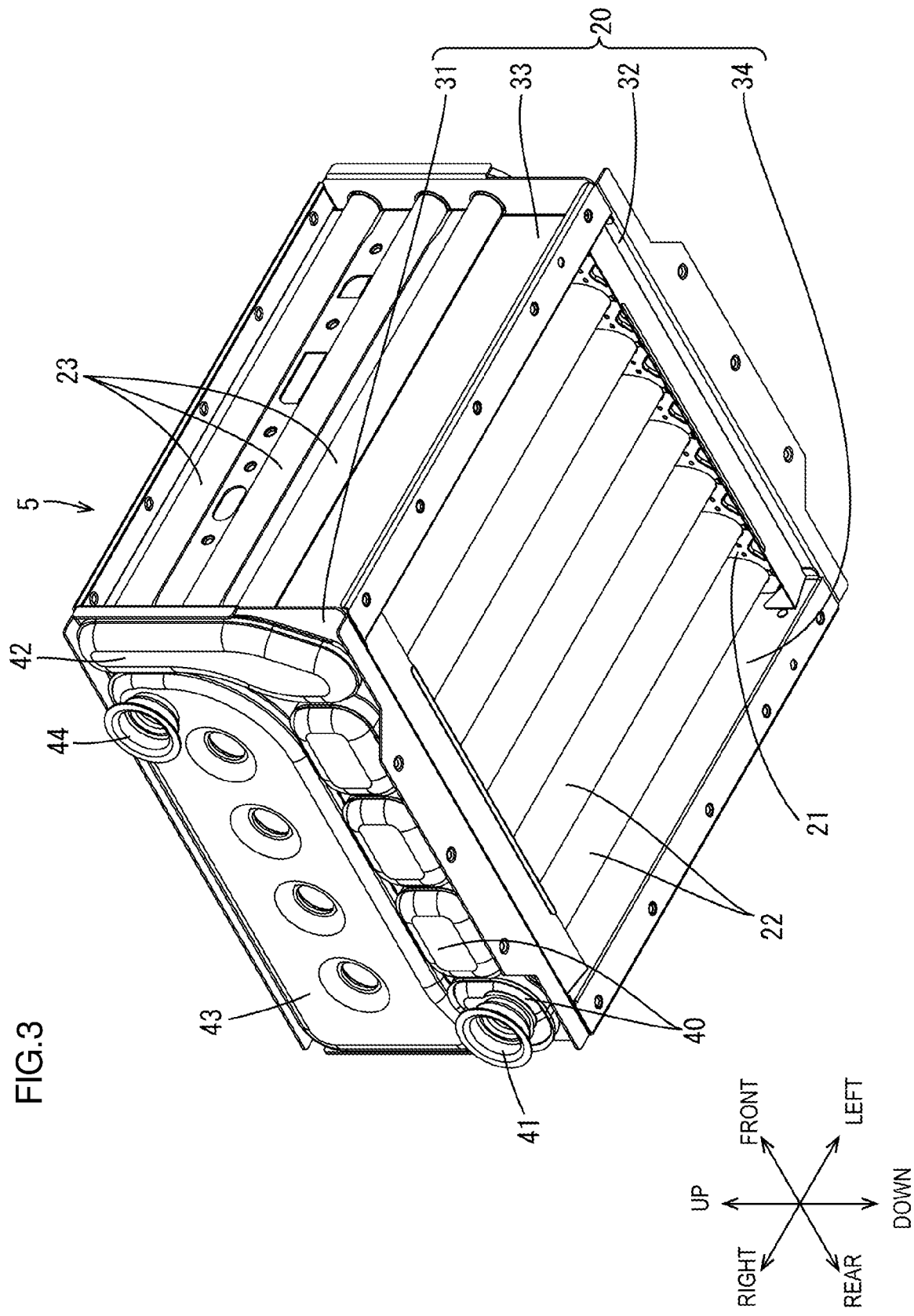
FIG. 3 is a perspective view of a primary heat exchanger.

As shown in FIG. 3, the primary heat exchanger 5 includes an inner casing 20 (an example of a case), fins 21, heat transfer tubes 22 (eight in this embodiment), and water flow pipes 23 (six in this embodiment). The inner casing 20 is rectangular cylindrical. The inner casing 20 is fixed to the burner 4. In the inner casing 20, combustion exhaust gas generated at the burner 4 flows from above to below (see FIG. 2). A heat of the combustion exhaust gas is transferred to water passing through the heat transfer tubes 22.

The inner casing 20, the fins 21, the heat transfer tubes 22, and the water flow pipes 23 are made of stainless steel.

As shown in FIG. 1, a belt-like resin sheet 26 is wound around an upper part of an outer peripheral surface of the inner casing 20. The resin sheet 26 includes conductive patterns of a meandering shape stretched over an approximately whole surface of the resin sheet 26. The resin sheet 26 allows detection of leakage of combustion exhaust gas from the inner casing 20.

As shown in FIG. 3, the inner casing 20 includes a first wall 31, a second wall 32, a third wall 33, and a fourth wall 34. The first wall 31 and the second wall 32 face each other in a right-left direction (an example of a first direction). One (front) end part of the first wall 31 and one (front) end part of the second wall 32 are jointed via the third wall 33. The other (rear) end part of the first wall 31 and the other (rear) end part of the second wall 32 are jointed via the fourth wall 34. The third wall 33 and the fourth wall 34 face each other in a front-rear direction (an example of a second direction). In this embodiment, the first wall 31 is a right side wall of the inner casing 20, and the second wall 32 is a left side wall of the inner casing 20. The third wall 33 is a front side wall of the inner casing 20, and the fourth wall 34 is a rear side wall of the inner casing 20.

Figure 4:
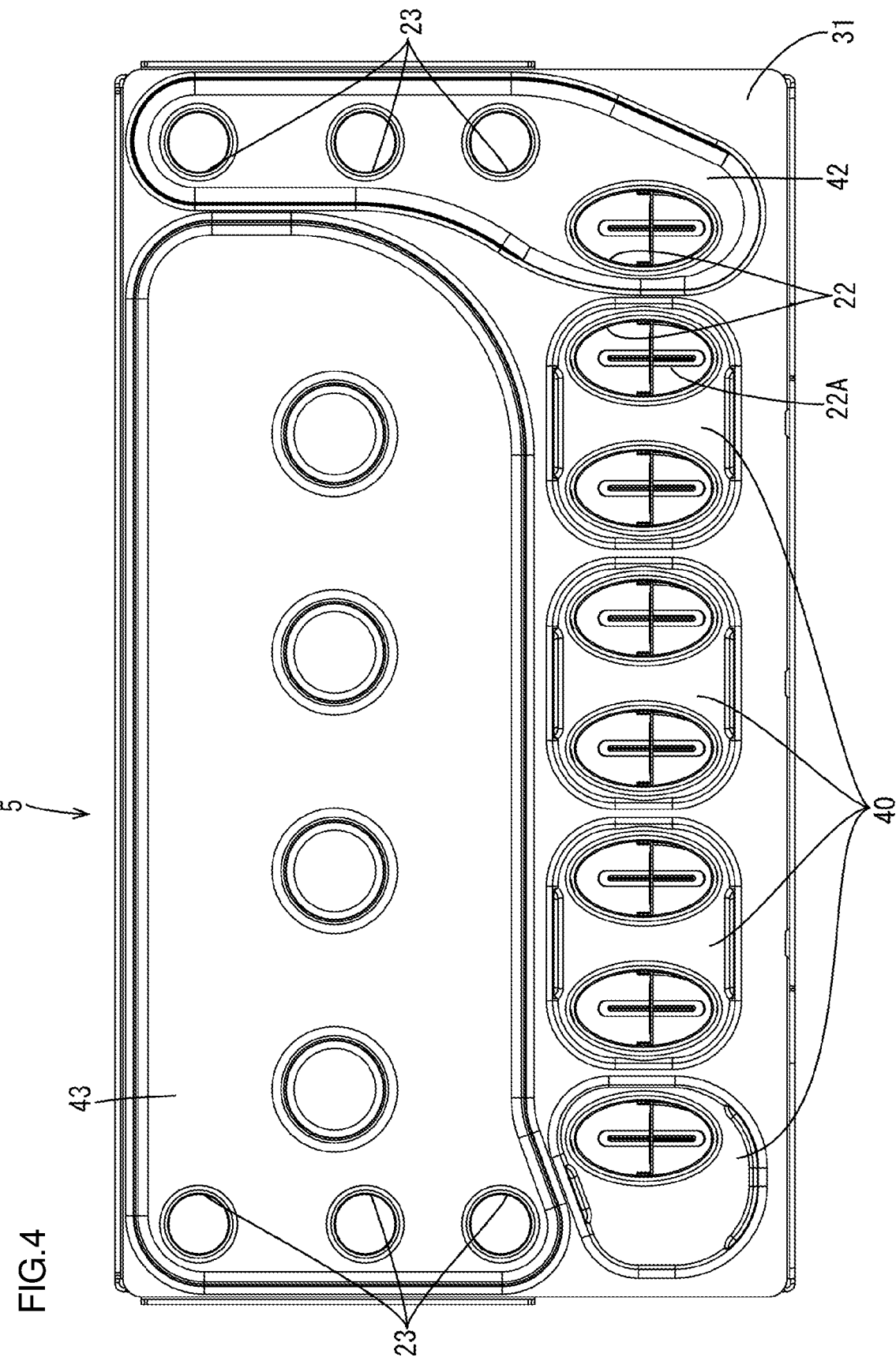
FIG. 4 is a right-side view of the primary heat exchanger with lid parts of headers being not illustrated.
Figure 5:
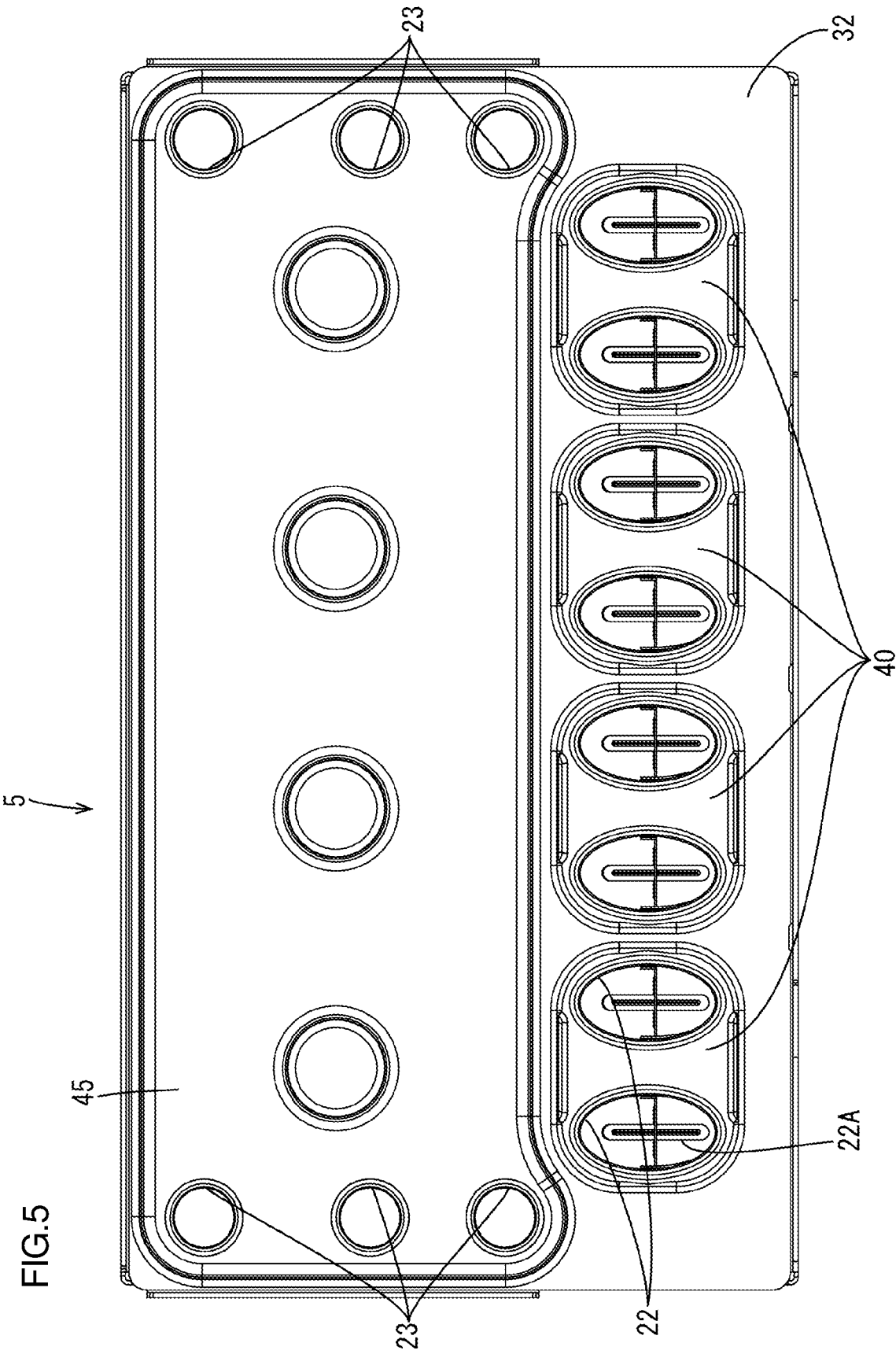
FIG. 5 is a left-side view of the primary heat exchanger with lid parts of headers being not illustrated.
Figure 6:
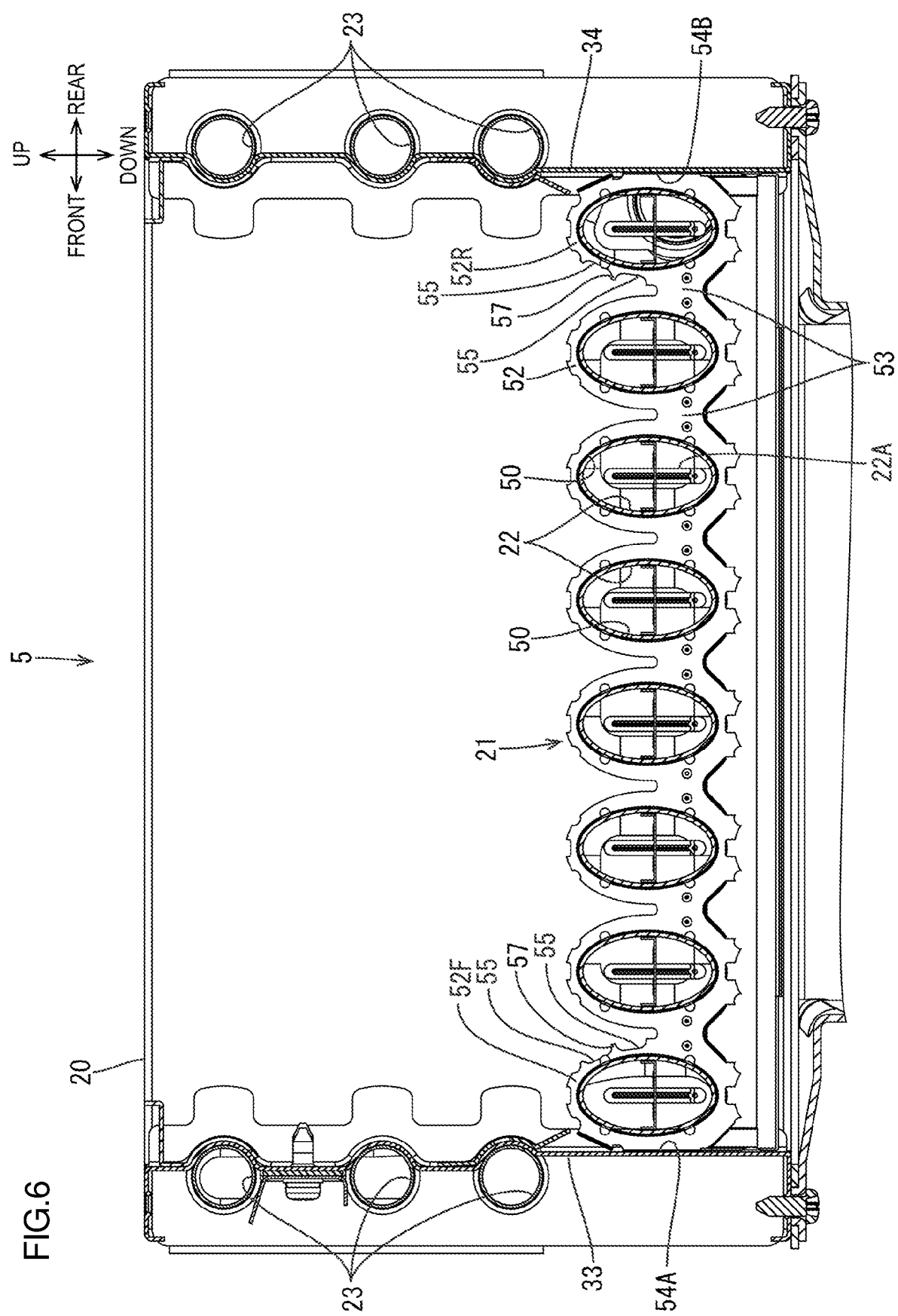
FIG. 6 is a cross-sectional view taken along A-A line in FIG. 2.

As shown in FIGS. 3 and 6, the fins 21 (only some of the fins 21 are shown) are disposed in a lower portion of the inner casing 20. The fins 21 are arranged in parallel to each other at predetermined intervals along the right-left direction. The heat transfer tubes 22 have linear shapes extending along the right-left direction. The heat transfer tubes 22 are disposed in the lower portion of the inner casing 20 and arranged in parallel in the front-rear direction. The heat transfer tubes 22 penetrate the fins 21 in the right-left direction. As shown in FIGS. 4 to 6, a cross-sectional shape of each of the heat transfer tubes 22 is an elliptic shape having a major axis in a vertical direction. In each of the heat transfer tubes 22, a flow velocity control member 22A is disposed for controlling a flow velocity of water and agitating water.

As shown in FIGS. 3 and 6, the water flow pipes 23 are located at upper positions with respect to the heat transfer tubes 22. Three water flow pipes 23 are arranged in parallel along the vertical direction at predetermined intervals on each of outer wall surfaces of the third wall 33 and the fourth wall 34 of the inner casing 20. The water flow pipes 23 have a linear shape extending in the right-left direction. A cross-sectional shape of each of the water flow pipes 23 is circular.

As shown in FIGS. 3 to 5, lower side headers 40 are attached to lower parts of the first wall 31 and the second wall 32. In FIGS. 4 and 5, lid parts of headers 40, 42, 43, 45 are not illustrated in order to clearly show connections between the heat transfer tubes 22 or water flow pipes 23 and headers 40, 42, 43, 45.

As shown in FIGS. 4 and 5, each of the lower side headers 40 connects right or left ends of two of the heat transfer tubes 22 that are adjacent to each other in the front-rear direction. As a result, the heat transfer tubes 22 are connected to each other and forms a meandering pathway for water. However, the lower side header 40 disposed at the rearmost position on the first wall 31 is connected only to a right end of the heat transfer tube 22 disposed at the rearmost position among the heat transfer tubes 22. As shown in FIG. 3, the lower side header 40 disposed at the rearmost position on the first wall 31 is connected to a joint tube 41. As shown in FIG. 1, the joint tube 41 is connected to the secondary heat exchanger 6 via a connection pipe 24.

As shown in FIG. 4, a right end of the heat transfer tube 22 disposed at the frontmost position among the heat transfer tubes 22 is connected to right ends of three front side water flow pipes 23 via a front side header 42 extending in the vertical direction.

As shown in FIGS. 3 and 4, a first header 43 is attached to an upper part of the first wall 31. The first header 43 is connected to right ends of rear side water flow pipes 23. As shown in FIG. 3, a joint tube 44 is mounted in a right upper part of the first header 43. As shown in FIG. 2, the joint tube 44 is connected to a hot water outlet pipe 25.

As shown in FIG. 5, a second header 45 is attached to an upper part of the second wall 32. The second header 45 is connected to left ends of front side water flow pipes 23 and left ends of rear side water flow pipes 23. Namely, the second header 45 connects left ends of three front side water flow pipes 32 and three rear side water flow pipes 32.

Therefore, water flows through a water flow path in the primary heat exchanger 5 as follows.

Water flowing into the rearmost heat transfer tube 22 from the connection pipe 24 passes through the heat transfer tubes 22 via the lower side headers 40 to the front side in a meandering way. Then, water flowing out from the frontmost heat transfer tube 22 flows into the three front side water flow pipes 23 via the front side header 42 and moves to the left side through the three front side water flow pipes 23. Then, the water flows into the three rear side water flow pipes 23 via the second header 45 and moves to the right side through the three rear side water flow pipes 23. Water flowing out from the three rear side water flow pipes 23 flows out from the hot water outlet pipe 25 via the first header 43.

[Fins, Through Holes]

A structure of each of the fins 21 will be described below with reference to FIGS. 6 to 8.

The fin 21 is a laterally long plate member extending in the front-rear direction. As shown in FIG. 6, eight oval shaped through holes 50 are formed in the fin 21 and disposed at intervals in the front-rear direction. The heat transfer tubes 22 are inserted into the through holes 50 of the fins 21.

[Heat Receiving Portions, Connecting Portions]

Figure 8:
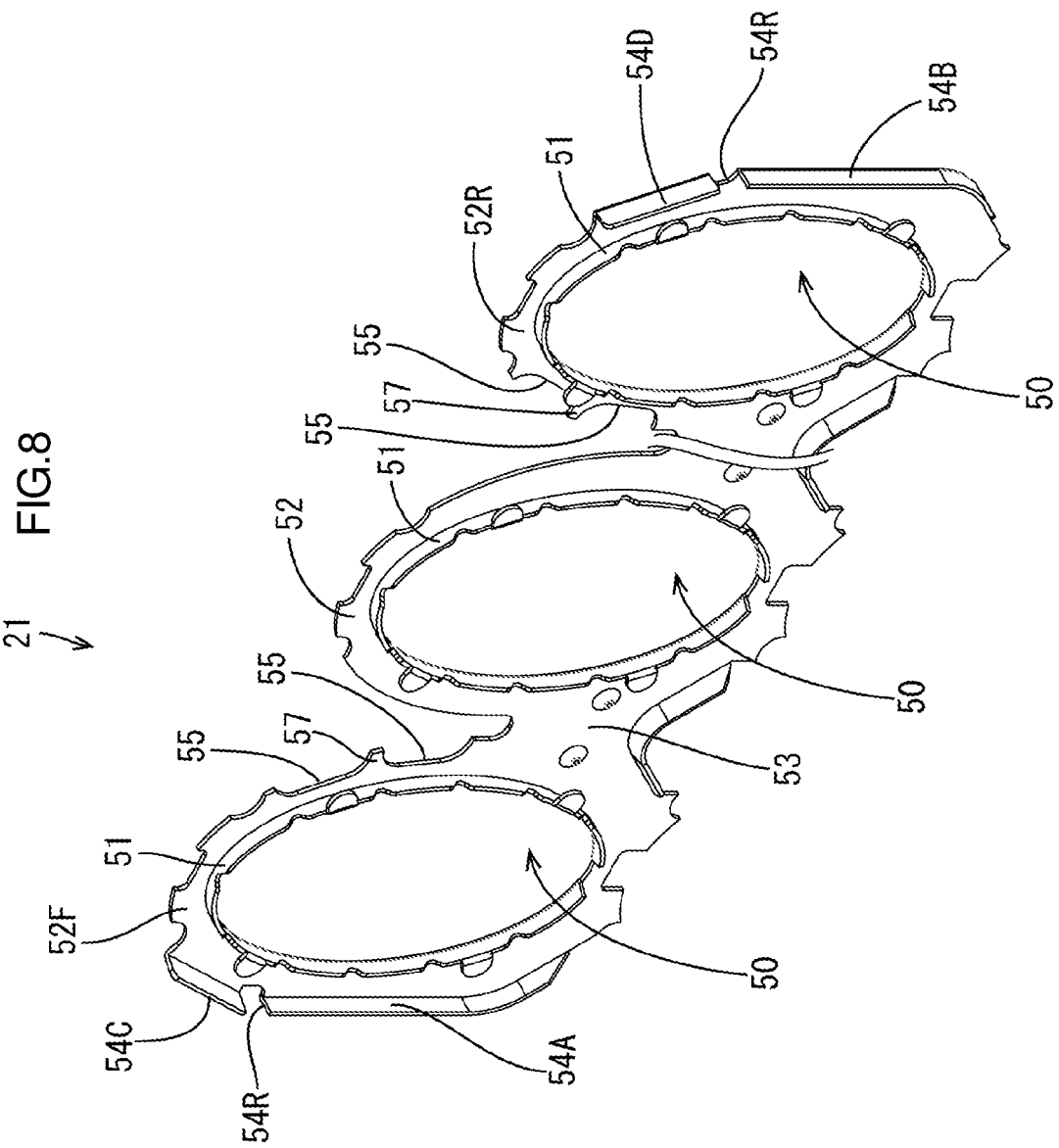
FIG. 8 is a perspective view of the fin with a repeated structure being not illustrated.

As shown in FIG. 8, burring parts 51 protrude leftward from inner edges of the through holes 50 of the fins 21. Each of the fins 21 includes flange shaped heat receiving portions 52, 52F, 52R. The fin 21 includes the heat receiving portion 52F and the heat receiving portion 52R at front and rear ends, respectively, and receiving portions 52 between the heat receiving portion 52F and the heat receiving portion 52R. The heat receiving portions 52, 52F, 52R extend outward in a radial direction of the through holes 50 from hole edges of the through holes 50, respectively. The fins 21 include the heat receiving portions 52, 52F, 52R and connecting portions 53 that connect the heat receiving portions 52, the heat receiving portion 52 and the heat receiving portion 52F, the heat receiving portion 52 and the heat receiving portion 52F. Each of the heat receiving portions 52, 52F, 52R has an ovel frame shape and includes the through hole 50. The burring parts 51 protrude from hole edges of the through holes 50. The heat receiving portions 52, 52F, 52R receive heat from combustion exhaust gas flowing in the inner casing 20 from the above to the below, transfer the heat to the heat transfer tubes 22 inserted in the through holes 50, and warm up water in the heat transfer tubes 22. The heat receiving portions 52, 52F, 52R are connected by the connecting portions 53 at lower portions of the heat receiving portions 52, 52F, 52R.

[Edge Portions]

Each of the fins 21 includes a first edge portion 54A on the front end and a second edge portion 54B on the rear end. The first edge portion 54A protrudes leftward from a front end of the fin 21 and the second edge portion 54B protrudes leftward from a rear end of the fin 21. Namely, the first edge portion 54A protrudes from a front edge of the heat receiving portion 52F and the second edge portion 54B protrudes from a rear edge of the heat receiving portion 52R. As shown in FIG. 6, the first edge portion MA is disposed to abut on a lower part of an inner wall surface of the third wall 33 and fixed. The second edge portion MB is disposed to abut on a lower part of an inner wall surface of the fourth wall 34 and fixed. Each of the fins 21 further includes a third edge portion MC and a fourth edge portion MD that protrude leftward from the front end and the rear end of the fin 21, respectively. The third edge portion MC is on an upper side of the first edge portion MA and spaced away from the first edge portion MA. The fourth edge portion MD is on an upper side of the second edge portion MB and spaced away from the first edge portion MB. A recess MR is between the first edge portion MA and the third edge portion MC and between the second edge portion MB and the fourth edge portion MD.

[Cavity Portions]

As shown in FIG. 8, the heat receiving portions 52F, 52R of each of the fins 21 include cavity portions 55. The cavity portions 55 are included in the upper parts of the heat receiving portions 52F, 52R and recessed inward in the radial direction of the through holes 50. The cavity portions 55 are recessed portions that are recessed inward in the radial direction of the through holes 50 from outer edges of the heat receiving portions 52F, 52R. The recessed portions included in the heat receiving portion 52F are included in a first recessed portion. The recessed portions included in the heat receiving portion 52R are included in a second recessed portion. By providing the cavity portions 55, the volume of the upper parts of the heat receiving portions 52F, 52R decreases and therefore, quantity of the heat that the upper parts of the heat receiving portions 52F, 52R receive from combustion exhaust gas passing through the inner casing 20 is reduced (see FIGS. 6 and 7). Therefore, quantity of the heat that upper parts of the heat transfer tubes 22 receive from the upper parts of the heat receiving portions 52F, 52R decreases. Heat of the combustion exhaust gas that is not recovered by the upper parts of the heat receiving portions 52F, 52R is recovered by lower parts of the heat receiving portions 52F, 52R, and the heat thus recovered is transferred to lower parts of the heat transfer tubes 22. Thus, by providing the cavity portions 55 on the upper parts of the heat receiving portions 52F, 52R, the heat that the lower parts of the heat transfer tubes 22 receive increases.

[Temperature Difference Suppression Portions]

When combustion exhaust gas passes through the inner casing 20 from the above to the below, upper parts of the heat transfer tubes 22 become hotter than lower parts of those. Consequently, the heat transfer tubes 22 tend to deform with upward warping. In this embodiment, however, the cavity portions 55 function as temperature difference suppression portions that reduces temperature difference between the upper parts and the lower parts of the heat transfer tubes 22 and therefore, the heat transfer tubes 22 disposed at front and rear ends of the fins 21 are less likely to be deformed.

The heat transfer tubes 22 disposed at the front and rear ends of the fins 21 are close to the first edge portion 54A and the second edge portion 54B with which the fins 21 are fixed to the inner casing 20. Therefore, the deformation of the heat transfer tubes 22 at the front and rear ends caused by thermal expansion tends to be limited by a fixing structure of the first edge portion 54A, the second edge portions 54B, and the inner casing 20. However, by providing the cavity portions 55, the deformation of the heat transfer tubes 22 at the front and rear ends is suppressed, and the heat transfer tubes 22 at the front and rear ends are less likely to be damaged by the thermal expansion.

The heat receiving portions 52 that are disposed between the heat receiving portions 52F, 52R do not include the cavity portions 55. Namely, the heat receiving portions 52 disposed in a middle inside the inner casing 20 do not include the cavity portions 55 (see FIG. 6). The deformation of the heat receiving portions 52 disposed in the middle of the inner casing 20 is not limited by their surroundings. Therefore, the heat transfer tubes 22 disposed in the middle of the inner casing 20 are allowed to deform and hardly damaged.

Thus, since the heat receiving portions 52 disposed in the middle of the inner casing 20 do not include the cavity portions 55, reduction in the quantity of the heat that the fins 21 receive from combustion exhaust gas is suppressed and lowering of heat efficiency of the primary heat exchanger 5 is suppressed.

As shown in FIGS. 6 and 8, the heat receiving portions 52F disposed at the front ends include the cavity portions 55 on rear upper parts of the heat receiving portions 52F. The heat receiving portions 52R disposed at the rear ends include the cavity portions 55 on front upper parts of the heat receiving portions 52R. Namely, in the heat receiving portions 52F, 52R, the cavity portions 55 are disposed apart from the first edge portion 54A and the second edge portion 54B, respectively, in the front-rear direction.

The cavity portions 55 included in the heat receiving portion 52F is near the connecting portion 53 connecting the heat receiving portion 52F and the heat receiving portion 52. The cavity portions 55 included in the heat receiving portion 52R is near the connecting portion 53 connecting the heat receiving portion 52R and the heat receiving portion 52.

Figure 7:
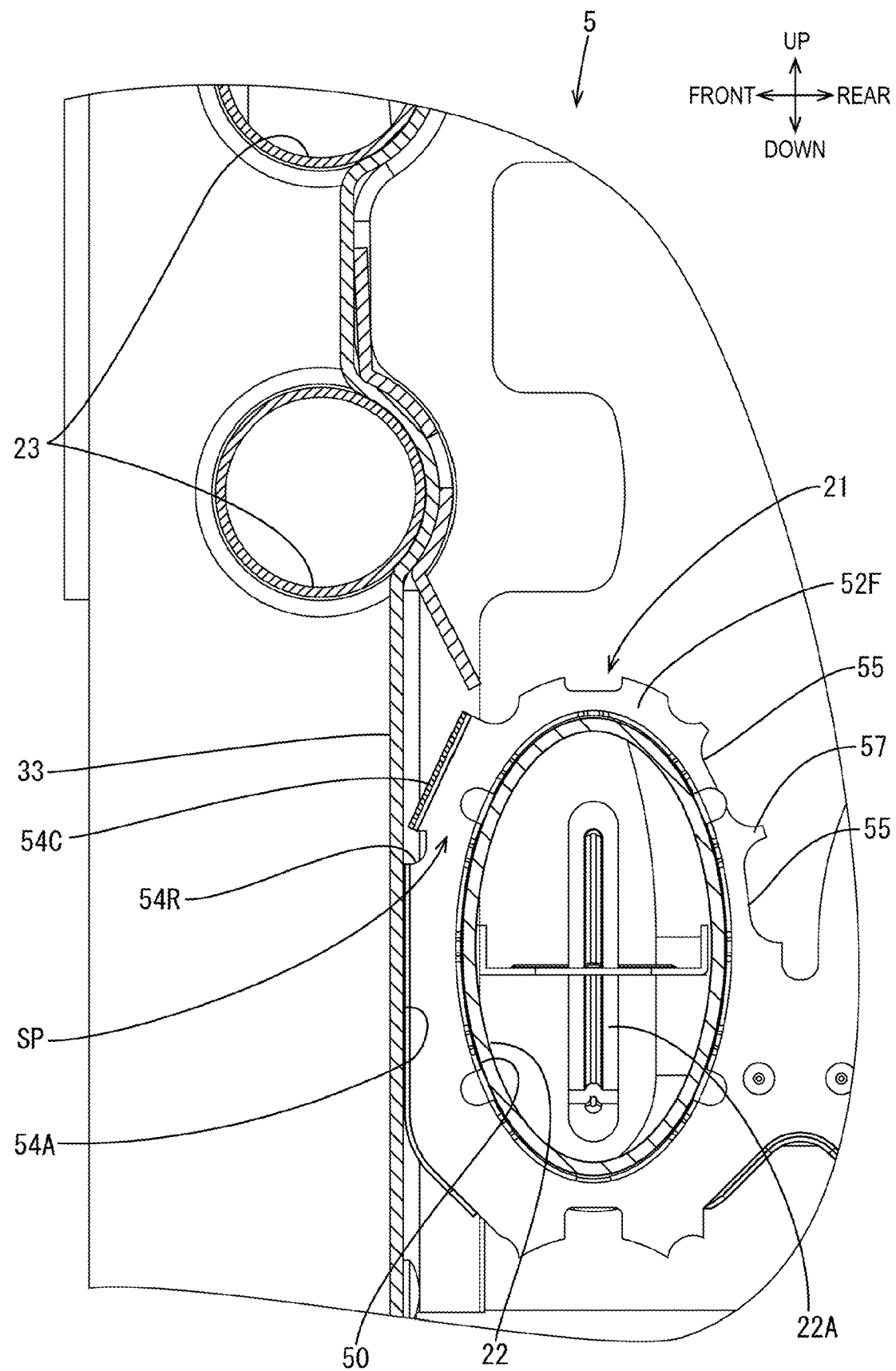
FIG. 7 is an expanded view of FIG. 6 illustrating a surrounding portion near a thorough-hole formed in a front end portion of a fin.

Normally, as shown in FIG. 7, combustion exhaust gas is less likely to pass through a space SP between the heat transfer tube 22 and each of the first edge portion 54A, the third edge portion 54C. A portion of an upper part of the heat receiving portion 52F near the first edge portion 54A and the third edge portion 54C (front side part in FIG. 7) receives smaller amount of heat than the amount of heat that a portion of the upper part of the heat receiving portion 52F on an opposite side from the first edge portion 54A and the third edge portion 54C in the front-rear direction (rear side part in FIG. 7) receives. Therefore, with the heat receiving portion 52F not including the cavity portion 55 in a portion close to the first edge portion MA but including the cavity portion 55 in a portion apart from the first edge portion 54A and the third edge portion 54C in the front-rear direction, the quantity of heat that the front upper part of the heat receiving portion 52F receives from combustion exhaust gas and the quantity of heat that the rear upper part of the heat receiving portion 52F receives from combustion exhaust gas can be balanced. Furthermore, the damage of the heat transfer tube 22 caused by thermal expansion is further suppressed. The heat receiving portion 52R has same configuration and effects as those of the heat receiving portion 52F.

[Protrusion Portions]

The heat receiving portion 52F, 52R includes the cavity portions 55 that are adjacent to each other. In this embodiment, as shown in FIG. 7, the front side heat receiving portion 52F includes two cavity portions 55 and a protrusion portion 57 between the two cavity portions 55. The protrusion portion 57 protrudes outward in the radial direction of the through hole 50 from the hole edge of the through hole 50. The rear side heat receiving portion 52R also includes two cavity portions 55 and the protrusion portion 57 (see FIG. 6). The protrusion portion 57 has a length extending along the hole edge of the through hole 50. The cavity portion 55 has a recessed bottom having a length extending along the hole edge of the through hole 50. The length of the protrusion portion 57 is much smaller than the length of the recessed bottom of the cavity portion 55.

With the cavity portions 55, the heat that the heat receiving portion 52F, 52R receives may be excessively decreased. However, with the protrusion portion 57, such excessive decrease in the heat that the heat receiving portion 52F, 52R receives is suppressed. The protrusion portion 57 can be used as a holding part with which the fin 21 can be held when the through holes 50 and the burring parts 51 are formed in a process of producing the fin 21 by processing a metal plate.

[Secondary Heat Exchanger]

As shown in FIG. 2, the secondary heat exchanger 6 includes a lower casing 80 that is rectangular cylindrical and communicates with the inner casing 20. In the lower casing 80, heat transfer plates with concave/convex structures are stacked with a predetermined space in between. Internal flow paths are formed between the heat transfer plates. The internal flow paths, which are continuous to each other, are provided with inlets connected to a water supply pipe 81 and outlets connected to the connection pipe 24.

The exhaust portion 7 includes a drain receiver 82 and an exhaust duct 83. The drain receiver 82 is attached to a lower surface of the lower casing 80 of the secondary heat exchanger 6. The exhaust duct 83 is erected from a rear part of the drain receiver 82. A bottom part of the drain receiver 82 is connected to a neutralizer 85 via a drain discharge pipe 84.

The exhaust duct 83 is made of synthetic resin. The exhaust duct 83 is laterally long and rectangular cylindrical. An upper cover 86 is joined to an opening edge of an opening formed at the upper end of the exhaust duct 83. The upper cover 86 has an exhaust cylinder 87 with a cylindrical shape that protrudes from an upper surface of the outer casing 2.

[Explanation of Operation of Water Heater]

In the water heater 1, when water is introduced into the instrument, the controller 12 drives the fan motor 17 to rotate the fan with a rotation rate according to a combustion amount requested by a remote controller etc. Then, an air is sucked into the fan unit 8 such that an air amount is proportional to the rotation rate of the fan. Simultaneously, a fuel gas is supplied from the gas introduce pipe 11, and the gas governor 9 controls a pressure of the fuel gas. After that, the fuel gas is mixed with an air that is introduced via a venturi provided at a suction side of the fan unit 8, and a mixture of the fuel gas and the air is produced. The mixture produced is discharged from a discharge port of the fan case 16 into the chamber 15 of the burner 4 and suppled in the upper casing 14. The mixture is ejected from each of the flame holes of the flame hole plate and burns by being ignited by ignition electrodes.

Combustion exhaust gas from the burner 4 passes through a space between the fins 21 in the inner casing 20 of the primary heat exchanger 5 from the above to the below and exchanges heat with water flowing in the heat transfer tube 22, and sensible heat is recovered.

At this occasion, with the cavity portions 55 (the temperature difference suppression portions), temperature difference between the upper parts and the lower parts of the heat transfer tubes 22 disposed at front and rear ends can be decreased and therefore, the heat transfer tubes 22 disposed at front and rear ends are less likely to be damaged by thermal expansion.

Combustion exhaust gas discharged from the primary heat exchanger 5 passes through spaces between the heat transfer plates in the lower casing 80 of the secondary heat exchanger 6 and exchanges heat with water flowing in the internal flowing paths of the heat transfer plates, and latent heat is recovered.

Combustion exhaust gas having passed through the lower casing 80 enters the drain receiver 82 of the exhaust portion 7, moves to a rear part of the drain receiver 82, ascends in the exhaust duct 83, and is discharged from the exhaust cylinder 87 to the outside. A drain generated in the secondary heat exchanger 6 drops into the drain receiver 82 and is discharged to the outside of the instrument through the drain discharge pipe 84 and the neutralizer 85.

[Effects of Embodiment]

As above, in the primary heat exchanger 5 of this embodiment, the fins 21 include the heat receiving portions 52, 52F, 52R, the first edge portion 54A, the second edge portion 54B, and the temperature difference suppression portions (the cavity portions 55). The heat receiving portions 52, 52F, 52R are flange shaped and extend outward in the radial direction of the through holes 50 from the hole rim parts of the through holes 50, respectively. The first edge portion 54A and the second edge portion 54B are disposed at front and rear ends of each of the fins 21. The first edge portion 54A is fixed to the third wall 33 and the second edge portion 54B is fixed to the fourth wall 34. The temperature difference suppression portions reduce a temperature difference between the upper parts and the lower parts of the two of the heat transfer tubes 22 disposed at front and rear ends.

According to this configuration, the temperature difference suppression portions can reduce the temperature difference between the upper parts and the lower parts of the two of the heat transfer tubes 22 disposed at front and rear ends. Therefore, the transfer tubes 22 disposed at front and rear ends are less likely to be damaged by thermal expansion.

In this embodiment, as an example of the temperature difference suppression portions, the cavity portions 55 are formed in upper parts of the heat receiving portions 52F, 52R disposed at front and rear ends of the fins 21. The cavity portions 55 are recessed inward in the radial direction of the through holes 50. Therefore, with the cavity portions 55 having a simple structure, the heat that the upper parts of the heat receiving portions 52F, 52R receive from combustion exhaust gas can be reduced and thus the temperature difference between the upper parts and the lower parts of the two of the heat transfer tubes 22 disposed at the front and rear ends can be reduced.

In this embodiment, the heat receiving portion 52F, 52R includes the cavity portions 55 in a portion of the upper portion thereof that is away from the corresponding edge portion MA, MB. Although the combustion exhaust gas is less likely to pass near the portion of the heat receiving portion 52F, 52R close to the edge portion MA, MB, with the cavity portions 55, heat that the portion of the heat receiving portion 52F, 52R close to the edge portion MA, MB receives from combustion exhaust gas and heat that the portion of the heat receiving portion 52F, 52R away from the edge portion MA, MB receives from combustion exhaust gas can be uniformed. This further suppresses a damage of the heat transfer tube 22 by thermal expansion.

In this embodiment, the heat receiving portion 52F, 52R includes the cavity portions 55 that are provided adjacent to each other and the protrusion portion 57 between the cavity portions 55. Therefore, the protrusion portion 57 recovers heat from combustion exhaust gas and suppresses extreme decrease of heat efficiency that is caused by formation of the temperature difference suppression portions. The protrusion portion 57 is used as the holding part with which the fin 21 can be held when the through holes 50 and the burring parts 51 are formed in a process of producing the fin 21 by processing a metal plate.

The water heater 1 described in this embodiment includes the burner 4 and the primary heat exchanger 5 above described. Therefore, it is possible to provide the water heater 1 that includes the primary heat exchanger 5 including the heat transfer tubes 22 that are less likely to be damaged.

<Other embodiments>

The technology described herein is not limited to the embodiments described above with reference to the drawings. For example, features of the embodiments described above or below can be combined as far as they are compatible. Any feature of the embodiments described above or below that is not explicitly stated as essential may be omitted. The above embodiments may be altered as following.

A water heater may include only a primary heat exchanger.

A heat exchanger of present disclosure may be different types of heat exchangers including heat exchangers of a circulation type for bath and central heating.

The technical scope of present disclosure is not limited to the embodiment described above and may include all modifications in the scope of claim or its equivalent scope.

The invention claimed is:

1. A heat exchanger, comprising:
a case having a rectangular cylindrical shape and made of stainless steel, in which a combustion exhaust gas passes downward, the case including a first wall, a second wall, a third wall, and a fourth wall, the first wall and the second wall facing each other in a first direction, the third wall and the fourth wall facing each other in a second direction, the third wall connecting one side edges of the first wall and the second wall, the fourth wall connecting other side edges of the first wall and the second wall;
fins made of stainless steel and disposed in a lower portion of the case and arranged in the first direction, each of the fins having an elongated shape extending in the second direction and including a first end and a second end that is an opposite end from the first end, and each of the fins including through holes penetrating each of the fins in the first direction; and
heat transfer tubes made of stainless steel and arranged in the second direction and inserted in the through holes, wherein
each of the fins includes
heat receiving portions having a frame shape and extending around the through holes, the heat receiving portions arranged in the second direction and including a first heat receiving portion disposed at the first end of each of the fins and a second heat receiving portion disposed at the second end of each of the fins,
a first recessed portion included in the first heat receiving portion and recessed from an outer edge of an upper part of the first heat receiving portion and a second recessed portion included in the second heat receiving portion and recessed from an outer edge of an upper part of the second heat receiving portion,
connecting portions connecting the heat receiving portions adjacent to each other in the second direction, and
a first edge portion protruding in the first direction from the first end of each of the fins and fixed to the third wall and a second edge portion protruding in the first direction from the second end of each of the fins and fixed to the fourth wall, and
the first recessed portion includes recessed portions and the first heat receiving portion further includes a protrusion portion disposed between two of the recessed portions adjacent to each other.

2. The heat exchanger according to claim 1, wherein
the through holes include a first through hole around which the first heat receiving portion extends,
the protrusion portion has a length extending along a hole edge of the first through hole and each of the recessed portions has a recessed bottom having a length extending along the hole edge of the first through hole, and
the length of the protrusion portion is smaller than the length of the recessed bottom of each of the recessed portions.

3. The heat exchanger according to claim 1, wherein the first recessed portion is included in a portion of the first heat receiving portion that is an opposite side from the first edge portion in the second direction and the second recessed portion is included in a portion of the second heat receiving portion that is an opposite side from the second edge portion in the second direction.

4. The heat exchanger according to claim 1, wherein the first recessed portion is near one of the connecting portions connecting the first heat receiving portion and one of the heat receiving portions.

5. A water heater comprising a burner and the heat exchanger according to claim 1.

* * * * *